(12) United States Patent
Johri et al.

(10) Patent No.: US 11,110,803 B2
(45) Date of Patent: Sep. 7, 2021

(54) COMPENSATION OF HIGH VOLTAGE LOADS DURING PEDAL LIFT OPERATION

(71) Applicant: FORD GLOBAL TECHNOLOGIES, LLC, Dearborn, MI (US)

(72) Inventors: Rajit Johri, Canton, MI (US); Fazal Urrahman Syed, Canton, MI (US); Francis Thomas Connolly, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 178 days.

(21) Appl. No.: 16/362,381

(22) Filed: Mar. 22, 2019

(65) Prior Publication Data
US 2020/0298708 A1 Sep. 24, 2020

(51) Int. Cl.
*B60L 15/20* (2006.01)
*B60L 7/10* (2006.01)
*B60W 10/08* (2006.01)

(52) U.S. Cl.
CPC ............. *B60L 15/20* (2013.01); *B60W 10/08* (2013.01); *B60L 7/10* (2013.01); *B60L 2210/10* (2013.01); *B60L 2240/423* (2013.01); *B60W 2540/10* (2013.01)

(58) Field of Classification Search
CPC ................. B60L 15/20; B60L 2210/10; B60L 2240/423; B60W 10/08; B60W 2540/10
See application file for complete search history.

(56) References Cited

U.S. PATENT DOCUMENTS

| | | |
|---|---|---|
| 6,378,636 B1 | 4/2002 | Worrel |
| 9,592,820 B2 | 3/2017 | Park |
| 2013/0131931 A1* | 5/2013 | Mitsuyasu ........ F16H 61/66259 701/48 |
| 2016/0236540 A1* | 8/2016 | Ikeda ................. B60H 1/00764 |

FOREIGN PATENT DOCUMENTS

WO WO-2015024970 A2 * 2/2015 ............ B60W 10/04

* cited by examiner

*Primary Examiner* — Hunter B Lonsberry
*Assistant Examiner* — Jimin You
(74) *Attorney, Agent, or Firm* — David B. Kelley; Brooks Kushman P.C.

(57) ABSTRACT

A hybrid electric vehicle or a battery electric vehicle has an electric machine, a traction battery, and an accessory powered by the traction battery. The vehicle includes a controller that, in response to a driver lifting their foot off the accelerator pedal, increases the negative motor torque produced by the electric machine for charging the traction battery to compensate for a load applied by the accessory. The controller increases negative motor torque as limited by a maximum motor torque limit. The accessory may be an electric air conditioning compressor and/or a DC/DC inverter.

3 Claims, 2 Drawing Sheets

COMPENSATION OF HIGH VOLTAGE LOADS DURING PEDAL LIFT OPERATION

TECHNICAL FIELD

This disclosure relates to the control of a vehicle having an electric traction motor.

BACKGROUND

Electric Vehicles (EVs) and Hybrid Electric Vehicles (HEVs) are being developed with a goal of improving fuel efficiency. The above vehicles have at least one electric machine, or electric traction motor, that is controlled by one or more controllers that control the current supplied to the motor. The electric machine provides torque to drive the vehicle and also functions as a generator for charging one or more batteries and providing energy for powering electrical accessories. The controller also controls regenerative braking and traction battery charging to conserve energy.

SUMMARY

The controller of a vehicle having a traction motor is effective to adjust the torque provided to the wheels of the vehicle when a driver's foot is lifted off the accelerator momentarily or to operate the vehicle in a coasting mode. When the vehicle is operating high voltage accessories such as an electric air conditioning compressor, a DC/DC inverter, or the like, lifting off the accelerator pedal results in less regenerative braking battery charging unless the controller is programmed to adjust the torque provided by the wheels to the motor. For example, if the air conditioning system is turned on, the net energy gain in high voltage battery energy will be less than if the air conditioning system is off because a portion of the high voltage battery energy is consumed by the air conditioning compressor. When a vehicle coasts down a negative grade, the battery will receive less charge due to the air conditioning load on the high voltage battery. Additional energy can be recouped in a lift pedal mode if the controller of the traction motor(s) is calibrated to account for operation of high voltage accessories.

According to one aspect of this disclosure, a vehicle is disclosed that includes an electric machine, an engine, and a high voltage traction motor battery, referred to herein as the traction battery or traction motor battery. The vehicle includes a controller programmed to be responsive to accelerator pedal lift off during propulsion of the vehicle in an absence of the accessory load, controlling the electric machine to provide a first level of negative torque output for charging the traction motor battery. The controller is also responsive to accelerator pedal lift off during propulsion of the vehicle in a presence of an accessory load, whereby the electric machine is controlled to provide a second level of negative torque output that is greater than the first level of negative torque output for charging the traction motor battery.

According to another aspect of this disclosure, a vehicle is disclosed that comprises an electric motor, a battery, and at least one accessory powered by the battery. The vehicle includes a controller programmed in a pedal lift mode to be responsive to a power required by the at least one accessory to increase negative motor torque and increase the power provided to the battery.

According to a further aspect of this disclosure, a method is disclosed for operating a vehicle that includes a first step of establishing a normal lift pedal torque value based upon an impeller speed, an engine friction torque, and a drive mode. The method also includes a second step of compensating for an accessory load on a traction motor battery in response to a pedal lift, wherein a controller increases regenerative braking in response to a load applied by the accessory to provide additional regenerative braking for charging the traction motor battery.

The above aspects of this disclosure and other aspects will be described below with reference to the attached drawings.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
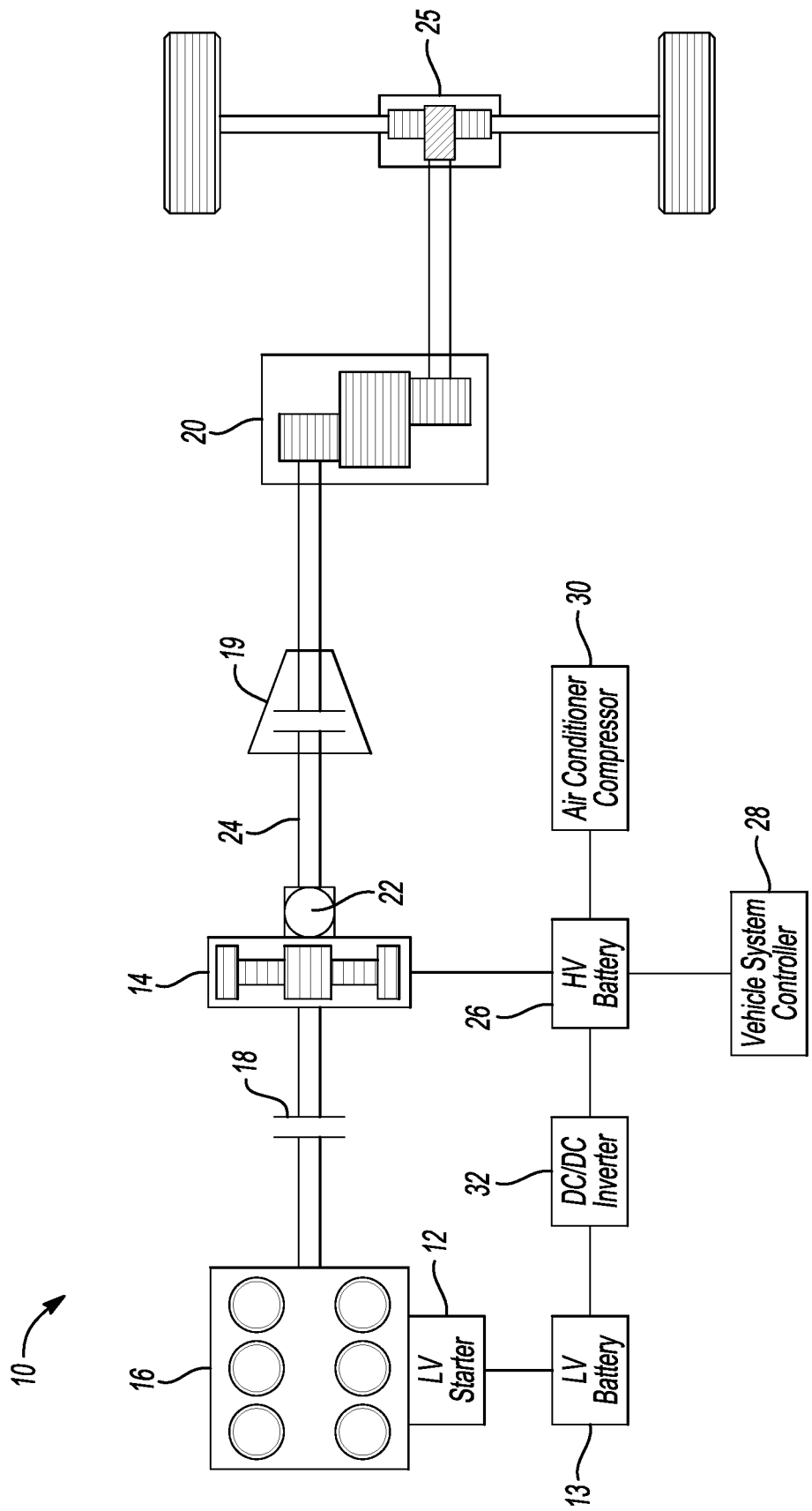
FIG. 1 is a schematic illustration of a vehicle.

The powertrain components of an example hybrid electric vehicle 10 are shown in FIG. 1. Other vehicle architectures, however, are also contemplated. As shown, the hybrid electric vehicle has a low voltage starter 12 powered by a low voltage battery 13 used to start the internal combustion engine 16. An electric machine 14 (motor/generator) is used to provide traction in conjunction with the engine 16 or independently in an electric operation mode. A disconnect clutch 18 separates the engine 16 and electric machine 14 and is used for torque isolation. A torque converter 19 with a bypass clutch, or alternatively a launch clutch, is located between the electric machine 14 and transmission gearbox 20. A transmission oil pump 22 is located on the same shaft 24 as the electric machine 14 and provides oil flow through the transmission gear box 20 for lubrication and hydraulic operation. The engine 16 is connected to the driveline though the disconnect clutch 18 which allows the engine 16 to be decoupled and shutdown independent of vehicle operation. The electric machine 14 is operatively connected between the engine 16 and torque converter 19. The torque converter 19 is connected to the transmission gearbox 20 and an axle and differential 25. The torque converter 19 with a bypass clutch, locks up the impeller and turbine of the torque converter 19.

Under normal operation, driver requests are interpreted by the Vehicle System Control (VSC) 28. The sources of driver torque requests include a gear selector (PRNDL) and accelerator pedal position sensor (APPS) that together interpret the driver's intention with regard to the desired wheel torque. The driver's input on the brake pedal position sensor (BPPS) is interpreted by the Brake System Control Module (BSCM) and a wheel torque modification request may be sent to the VSC 28 to adjust the final wheel torque.

The high voltage battery controller (BECM) monitors the traction battery 26 regarding temperature, voltage, current, battery State of Charge (SOC) and determines the maximum allowable discharge power limit and the maximum allowable charge power limit. The VSC 28 maintains the traction battery 26 SOC, minimizes fuel consumption and delivers the driver demanded vehicle operation. A Torque Control (TC) feature inside VSC determines torque split between the engine and electric machine.

The vehicle system control (VSC) described above does not account for the operation and current draw of an electric air conditioning compressor 30, a DC/DC inverter 32, or other high voltage accessories powered by the high voltage battery 26. The DC/DC inverter 32 converts the high voltage power from the high voltage battery to a lower voltage that may be used to charge the low voltage battery 13 or to provide power to other low voltage accessories in the vehicle.

Figure 2:
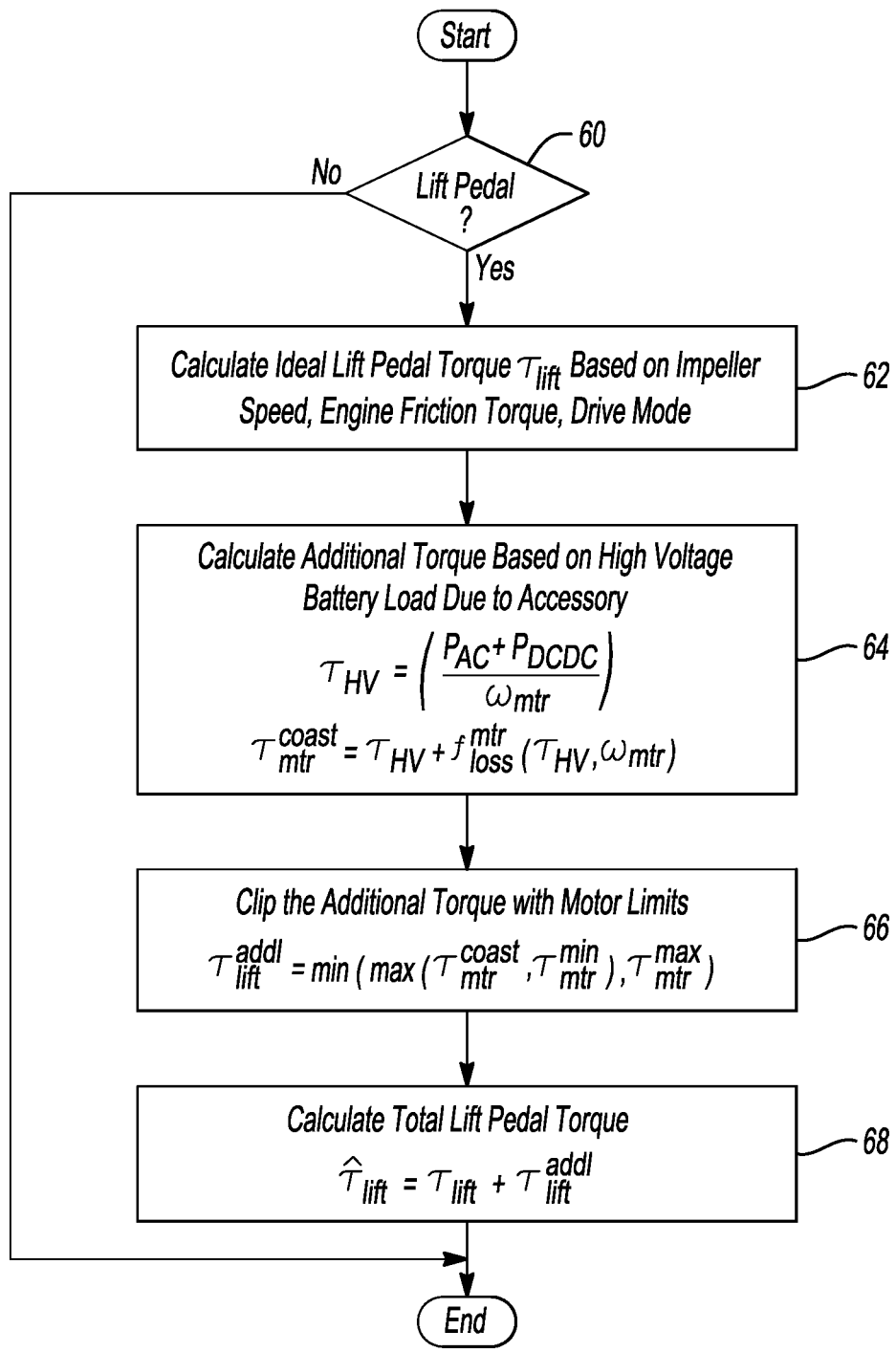
FIG. 2 is a flow chart of an algorithm for controlling the vehicle of FIG. 1.

Referring to FIGS. 1 and 2, a strategy is disclosed for modifying requested lift-pedal torque to account for high voltage loads, such as air conditioning loads or DC/DC inverter loads, while replicating the coasting feel of a conventional internal combustion engine vehicle. The strategy is applicable to EV and HEV configurations. The VSC 28 directs the electric machine to increase the negative torque provided by the motor to charge the traction motor battery 26.

The controller 28 detects a lift pedal event at 60. When fully lifted, the controller 28 calculates the ideal lift pedal torque $\tau_{lift}$ based upon the impeller speed of the launch clutch 18, engine 16 friction torque, and drive mode at operation 62. The additional negative motor torque applied by the electric machine to charge the traction motor battery 26 is calculated based upon the load applied by the air conditioner compressor 30, or DC/DC inverter 32, at operation 64 where:

$$\tau_{HV} = \left(\frac{P_{AC} + P_{DCDC}}{\omega_{mtr}}\right)$$

and $$\tau_{mtr}^{coast} = \tau_{HV} + f_{loss}^{mtr}(\tau_{HV}, \omega_{mtr})$$

where, $P_{AC}$ is the power required by air conditioning compressor, $P_{DCDC}$ is the DC/DC inverter load, $\omega_{mtr}$ is the present motor speed, $f_{loss}^{mtr}(.)$ is the motor loss at given torque and speed, and $\tau_{mtr}^{coast}$ is the additional torque required to compensate for HV load during lift pedal.

The additional torque is then clipped at operation 66 to motor mechanical limits:

$$\tau_{lift}^{addl} = \min(\max(\tau_{mtr}^{coast}, \tau_{mtr}^{min}), \tau_{mtr}^{max})$$

where, $\tau_{mtr}^{max}$, $\tau_{mtr}^{min}$ are the max and min motor torque limits based on motor mechanical considerations and not battery power limits.

The total lift pedal torque is then calculated at operation 68 as $$\hat{\tau}_{lift} = \tau_{lift} + \tau_{lift}^{addl}$$

where $\tau_{lift}$ is the original lift-pedal torque, $\hat{\tau}_{lift}$ is the final modified total lift-pedal torque.

Additional electric motor torque can be requested even when the high voltage battery SOC is full because the additional lift pedal torque term balances the high voltage load. Additional torque may not be requested if motor limits are reduced due to motor operating conditions.

Existing data sources are used by the controller to calculate the accessory load based upon the voltage and current provided to the air conditioning compressor 30 and the DC/DC inverter. Motor torque is also calculated based upon existing data sources such as the power produced by the motor and the motor speed. Existing sensors such as a pedal position sensor or speed sensors are also used by the system to minimize the cost of the system.

In operation, an electric vehicle when operating without operating accessories, such as an air conditioning compressor or a DC/DC inverter, operates the electric machine when the driver's foot is lifted off the accelerator pedal to produce negative torque ($\tau_{lift}$) that emulates the feeling lifting off the accelerator pedal of an internal combustion engine. The negative torque is used to charge the high voltage battery. The quantity of negative torque is a function of the torque converter impeller speed, the engine friction torque and the drive mode selected by the driver (PRNDL).

When the electric vehicle is operated with accessories drawing power from the traction motor battery 26, such as an air conditioning compressor 30 or a DC/DC inverter 32, the electric machine provides additional negative torque ($\tau_{HV}$), in addition to ($\tau_{lift}$), when the when the driver's foot is lifted off the accelerator pedal. The VSC 28 directs the electric machine 14 to produce the additional negative torque by increasing the drag on the driveline and, in turn, increases the charging rate of the high voltage battery 26.

A vehicle implementing the strategies contemplated herein may thus operate an electric machine to generate a first level of negative torque output responsive to accelerator pedal lift off during propulsion of the vehicle at a speed in an absence of an accessory load, and operate the electric machine to provide a second level of negative torque output that is greater than the first level of negative torque output responsive to accelerator pedal lift off during propulsion of the vehicle at the speed in a presence of the accessory load. As a result, a driver of the vehicle will feel more regenerative braking at a given speed when they lift their foot off the pedal when accessory loads are present as compared to when they are absent. Moreover, the feel may be more pronounced the more the accessory loads are present as the level of regenerative braking may depend on the magnitude of current draw of the accessory loads. While this change may be noticeable to the driver, the additional current generated may prevent the battery from discharging during pedal off conditions in a presence of the accessory loads.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for applications.

What is claimed is:

1. A method of operating a vehicle, comprising:
responsive to accelerator pedal lift off during propulsion of the vehicle at a speed in an absence of an accessory load demand, controlling an a motor/generator providing driving torque to the drive wheels of the vehicle to provide a first level of negative torque output; and
responsive to accelerator pedal lift off during propulsion of the vehicle at the speed in a presence of the accessory load demand, controlling the motor/generator providing driving torque to the drive wheels of the vehicle to provide a second level of negative torque output that is greater than the first level and that depends on a magnitude of the accessory load demand, wherein the accessory load demand includes an air conditioning compressor and a DC/DC inverter and the second level of negative torque output is calculated by a controller as follows:

$$\tau_{HV} = \left(\frac{P_{AC} + P_{DCDC}}{\omega_{mtr}}\right)$$

$$\tau_{mtr}^{coast} = \tau_{HV} + f_{loss}^{mtr}(\tau_{HV}, \omega_{mtr})$$

$$\tau_{lift}^{addl} = \min(\max(\tau_{mtr}^{coast}, \tau_{mtr}^{min}), \tau_{mtr}^{max})$$

$$\hat{\tau}_{lift} = \tau_{lift} + \tau_{lift}^{addl}$$

where $P_{AC}$ is the power required by air conditioning compressor, $P_{DCDC}$ is the DC/DC inverter load, $\omega_{mtr}$ is the present motor speed, $f_{loss}^{mtr}$ is the motor loss at given torque and speed, and $\tau_{mtr}^{coast}$ is the additional torque required to compensate for HV load during lift pedal, where, $\tau_{mtr}^{max}$, $\tau_{mtr}^{min}$ are the max and min motor torque limits based on motor mechanical considerations, and where $\tau_{lift}$ is the original lift-pedal torque, $\hat{\tau}_{lift}$ is the final modified total lift-pedal torque.

2. The method of claim 1, wherein the vehicle is a hybrid electric vehicle.

3. The method of claim 1, wherein the vehicle is a battery electric vehicle.

* * * * *